May 24, 1938. F. V. KEHL Re. 20,737
OFF-CENTER SWITCH HOOK
Original Filed July 3, 1936 2 Sheets-Sheet 1
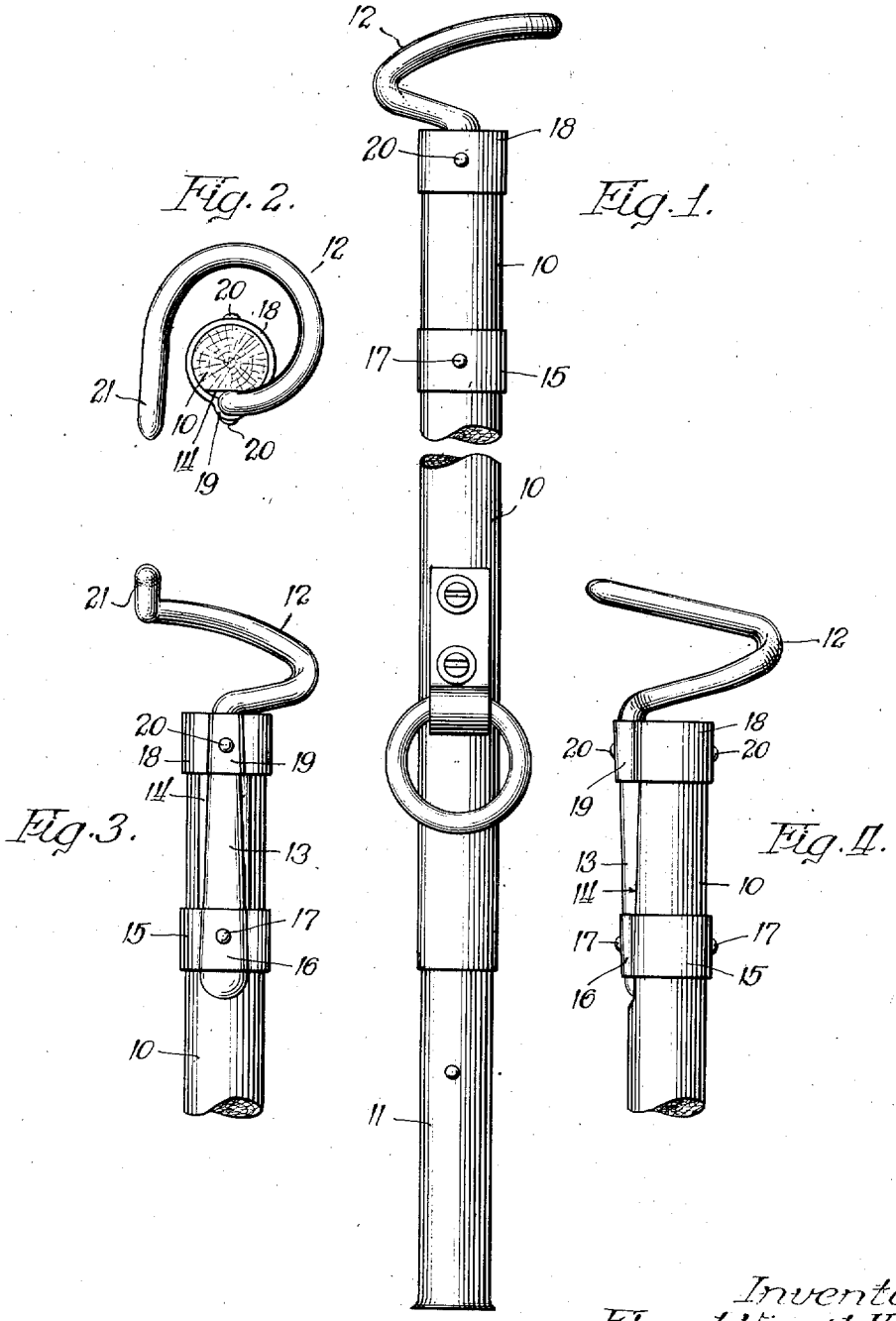
Inventor:
Floyd Virgil Kehl.
By Brown, Jackson, Boettcher, Dienner
Att'ys

OFF-CENTER SWITCH HOOK

Original Filed July 3, 1936 2 Sheets-Sheet 2

Inventor:
Floyd Virgil Kehl.

By Brown, Jackson, Boettcher & Dienner

Attys.

Reissued May 24, 1938

Re. 20,737

UNITED STATES PATENT OFFICE 20,737

OFF-CENTER SWITCH HOOK

Floyd Virgil Kehl, Indianapolis, Ind.

Original No. 2,084,617, dated June 22, 1937, Serial No. 88,745, July 3, 1936. Application for reissue January 17, 1938, Serial No. 185,370

3 Claims. (Cl. 81—3)

Figure 5:
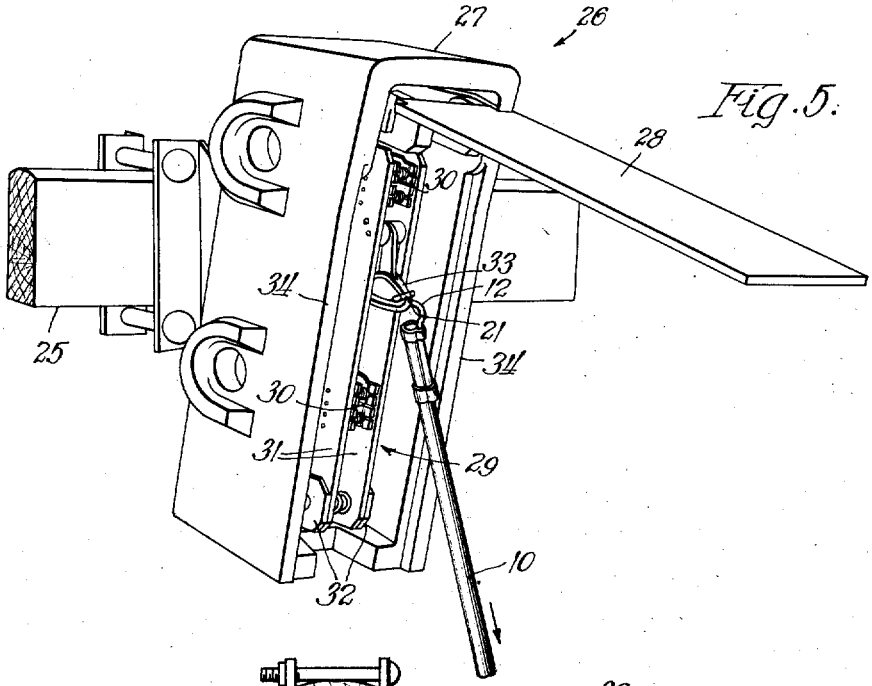

This invention relates to a safety device for operating switches, fuse cut-outs, and the like, particularly in high voltage work where the operator must be removed from the switch or fuse a safe distance.

I am aware of the fact that heretofore poles have been employed carrying an L-hook on its upper end, the hook invariably being attached to the pole by having its shank inserted axially in the end of the pole. These switch hooks resemble the ordinary window sash hooks and presented considerable difficulty in their use. Such a type hook as heretofore employed when inserted in the eye of the shiftable member of the switch or fuse out on the end of the pole in many cases twenty to twenty-four feet removed from the operator would slip out of the eye before the "end seal" could be broken and the shiftable member opened. A greater difficulty presented itself in attempting to close the member by such a hook. Slippage of the hook from the eye where the eye was mounted in close proximity to the conductors or bus bars frequently occasioned dangerous flashes and the like.

Another difficulty encountered in the use of switch hooks of the prior art is that they tend to twist about the longitudinal axis of the pole when a push or a pull is applied thereto. This is due to the fact that the point of contact of the hook with the eye of the switch or fuse cut-out is not in line with the longitudinal axis of the pole. This twisting action makes it difficult to operate the switch or fuse cut-out and increases the likelihood of the hook slipping out of the eye.

A primary object of my invention is to provide a switch hook having a certain form and mounted off center of the pole so that once the hook is engaged with the eye of the switch knife or eye of the fuse member, the pole carrying the hook will not be disengaged from the eye upon either pushing or pulling the pole and the engagement will be preserved until the pole is positively axially reversed to secure the release of the hook.

Another object of my invention is to provide for applying a push or a pull to the eye of a switch or fuse cut-out by means of a switch hook in such manner that the handle or pole does not twist in the hands of the operator.

It is of course a still further primary object of my invention to provide a greater factor of safety through the use of my invention than was afforded by the heretofore customarily employed switch hooks as above indicated.

Further important objects of the invention are to provide an extremely rugged structure and to provide such a form of hook that it will be intuitively used and automatically secured in position thereby without the operator having to work under extreme tension for fear of being brought into contact with the high voltage being handled.

Figure 6:
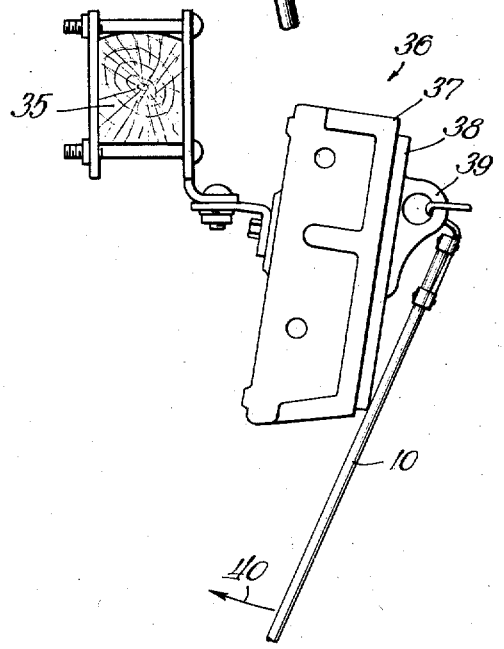

These and other objects will become apparent to those versed in the art in the following description of the invention as illustrated in the accompanying drawings, in which:

Figure 1 is a side elevation of a switch hook embodying my invention;

Figure 2, an end elevation of the hook;

Figure 3, a side elevation of the hook revolved 180° from that shown in Figure 1;

Figure 4, a left hand side elevation in reference to Figure 1;

Figure 5 is a perspective view of a box type of disconnecting switch with the cover open which shows how my improved switch hook may be employed in operating such a device; and Figure 6 is a view, in side elevation, of a box type fuse cut-out showing how my improved switch hook may be used to pry open the cover of such a device.

Like characters of reference indicate like parts in the several views in the drawings.

I employ a pole 10 made of any suitable insulating material and having the desired length, being fitted in the customary manner with a ferrule 11 on its lower end into which extension pieces may be fitted. On the upper end of the pole, in the form herein shown, I mount a hook 12. The hook 12 is provided with an attaching shank or tongue 13 which is flattened particularly on the pole side to bear against a flattened area 14 formed along one side of the pole 10. That is, the shank 13 is placed entirely on the outer side of the pole 10 so as to preserve the major cross sectional area of the pole. A ferrule 15 is telescoped over the pole and over the lower end of the tongue 13 to fit snugly thereover and therearound by an offset portion 16. The ferrule is secured in place by a rivet 17 passing entirely through the ferrule, the pole 10 and the tongue 13.

A simple ferrule 18 is telescoped over the upper end of the pole 10 and around the tongue 13 to fit snugly thereover and therearound by an offset portion 19. This ferrule 18 is secured in position by a through rivet 20 passing entirely through the ferrule, the upper end of the pole 10 and through the tongue 13. The snug engagement of the two ferrules 15 and 18 and their secure positioning by the rivets 17 and 20 taken together with the flat area of contact between the inner side of the tongue 13 and the side of the pole 10 insure a positive non-moving grip attachment of the shank 13 with the pole.

From the top end of the shank 13, the metal forming the hook proper is bent over at nearly right angles to the axis of this shank, Figure 3, to carry the metal outwardly from the side of the pole, Figure 2, and thence around and upwardly to follow more or less roughly a helical involute form until the curved portion has been carried around approximately 180°, from which portion the metal is then curved around and carried horizontally into a straight terminal end 21, the outer end of which is carried out in front of the shank 13 a slight distance as is indicated in Figures 2 and 4.

From the foregoing description of the form of the hook 12, it is to be observed that after the hook leaves the upper end of the shank 13, the hook is entirely outside of the pole and carried to one side thereof in its major portion. Since the curved portion of the hook between the upper end of the shank 13 and the terminal end 21 is thus located to one side of the pole, the terminal end may be inserted through the eye of the member to be operated upon and the pole given a slight turn so as to bring the hook around into engagement with this offset portion, this being permissible by reason of the portion being offset from the side of the pole. Furthermore, by reason of the particular conformation of the hook as above described, the pole may be pushed upwardly or pulled downwardly or even operated from an angle, all without disengagement of the hook from the member being operated upon unless the operator initially reverses the pole axially. It is also of considerable advantage to have the terminal end 21 mounted in spaced relation from the side of the pole, rather than extending radially therefrom, as will be readily appreciated by those versed in the art and particularly in the use of such a tool.

It will be observed that the eye of the switch or fuse cut-out will be normally engaged by the hook 12 at a point adjacent the base of the straight terminal end 21. That is, the hook 12 normally tends to seek a stable and safe operating position, regardless of whether the force applied to the pole 10 is along or transverse to its longitudinal axis and, therefore, there is no tendency for the pole 10 to twist in the hands of the operator. The hook 12 tends to seek this position because the center of curvature of the portion extending from the shank 13 is displaced from the longitudinal axis of the pole 10, with the result that the point of contact with the eye of a switch or fuse cut-out is that point which is farthest away from the center of the pole 10. If the eye is contacted at a position other than at this point, then there is a tendency for the hook 12 to rotate to such point on the application of suitable force to the pole 10. This is of considerable practical importance, since it prevents turning of the pole 10 and hook 12 in such direction that the hook 12 might tend to become disengaged from the eye of the switch or fuse cut-out unless the operator took special pains to securely grasp the pole 10 and prevent such twisting taking place.

In Figure 5 of the drawings, a cross arm 25 is shown on which may be mounted a box-type of disconnecting switch, shown generally at 26. This device comprises a box 27 formed of suitable insulating material, such as porcelain, and having a cover 28 that may be hinged at the top for closing the same. Within the box 27 is mounted a disconnecting switch, shown generally at 29, comprising upper and lower stationary contact members 30 that are arranged to be bridged by switch blades 31. It will be noted that the switch blades 31 are rotatably mounted at the lower end of the box 27 on a suitable clip 32. An eye 33, suitably rotatably mounted between the switch blades 31 is provided for receiving the hook 12 that is carried by the pole 10.

The eye 33 may be readily engaged by the hook 12 by inserting the straight terminal end 21 into the aperture of the eye 33 and turning the pole 10 about its longitudinal axis so that the hook 12 substantially completely encircles the eye 33, as illustrated. It will be observed that the construction of the hook 12 is such that it is substantially centrally located with respect to the pole 10 and, therefore, that it requires a minimum of clearance in entering the box 27. As a result the side walls 34 are not likely to be injured by a portion of the hook or pole engaging the same, as is often the case in other types of switch hooks now employed. It will be obvious that the switch 29 may be operated from the closed to the open position or vice versa by exerting a suitable pull or push on the pole 10.

In Figure 6 of the drawings I have shown a cross arm 35 on which may be suitably mounted a housed type of fuse cut-out, shown generally at 36. The cut-out 36 comprises a box or housing 37 formed of suitable insulating material, such as porcelain. The box 37 is provided with a door 38 that may be hinged at its lower end to the lower end of the box 37 in any suitable manner. An operating eye 39 is provided for opening and closing the door 38, as illustrated.

In order to open the door 38, the eye 39 is engaged by the hook 12 by inserting the straight terminal end 21 into the aperture, as indicated.

In some instances where the cut-out 36 has not been operated for some time, there is a tendency for the door 38 to be stuck in the closed position, with the result that sometimes considerable difficulty is encountered in opening it. If the hook 12 is inserted in the eye 30 and a direct pull is exerted on the pole 10, it is often the case that the door 38 is broken, due to the excessive force applied in starting the same from the closed position and the difficulty in controlling the force applied to the pole 10 once the door 38 starts to swing open.

When the switch hook according to the present invention is applied, a prying action may be exerted on the door 38 by inserting the hook 12 in the eye 39 and contacting the lower end of the door 38 with the pole 10, as shown in Figure 6. The pole 10 then is used as a lever with the fulcrum point at the lower end of the door 38, the operator pulling or pushing the outer end of the pole 10 in the direction indicated by the arrow 40. Since the eye 39 tends to engage the hook 12 at the point on the inner surface of the latter most remote from the longitudinal axis of the pole 10, there is no tendency for the pole 10 to rotate or twist in the hands of the operator when he applies the force to the lower end, other than to rotate to the stable position which, of course, is just what is desired.

While I have herein shown and described my invention in the one particular form, it is obvious that structural variations may be employed without departing from the spirit of the invention and I, therefore, do not desire to be limited to that precise form beyond the limitations as may be imposed by the following claims.

I claim:

1. A hook stick for opening and closing electric switches and fuse cut-outs having operating eyes comprising, in combination, a pole of insulating material, and hook means secured at and projecting generally axially from one end of said pole, said hook means being generally helically shaped to substantially completely encircle the operating eye of a switch or cut-out by turning of said handle substantially about its longitudinal axis whereby a push or a pull may be exerted on the switch or cut-out for closing or opening the same without likelihood of said hook means slipping out of said eye, the axis of said hook means being substantially parallel to the longitudinal axis of said pole.

2. A hook stick for opening and closing electric switches and fuse cut-outs having operating eyes comprising, in combination, a pole of insulating material, and hook means secured at and projecting generally axially from one end of said pole, the portion of said hook means projecting from said pole being generally in the form of a part of a convolution of a helix the axis of which is substantially parallel to and spaced from the longitudinal axis of said pole.

3. A hook stick for opening and closing electric switches and fuse cut-outs having operating eyes comprising, in combination, a pole of insulating material, and hook means secured at and projecting generally axially from one end of said pole, the portion of said hook means projecting from said pole being generally in the form of a part of a convolution of a helix the axis of which is substantially parallel to and spaced from the longitudinal axis of said pole, the outer end of said hook means being substantially straight to facilitate entering an operating eye.

FLOYD VIRGIL KEHL.